United States Patent Office 2,883,179
Patented Apr. 21, 1959

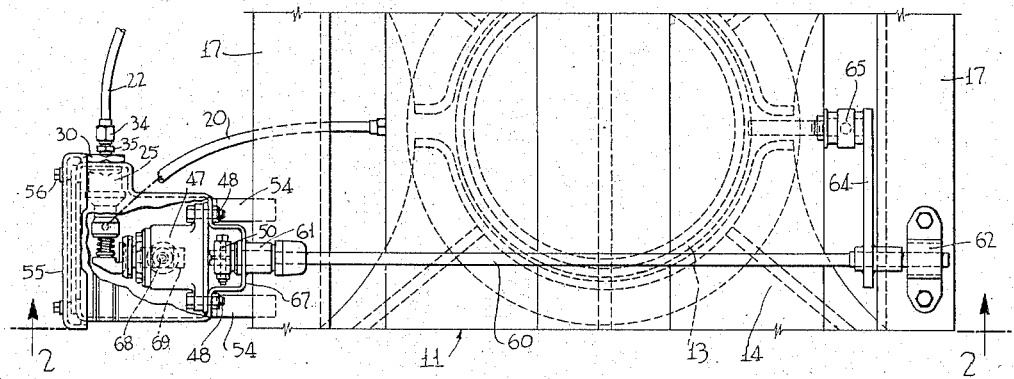
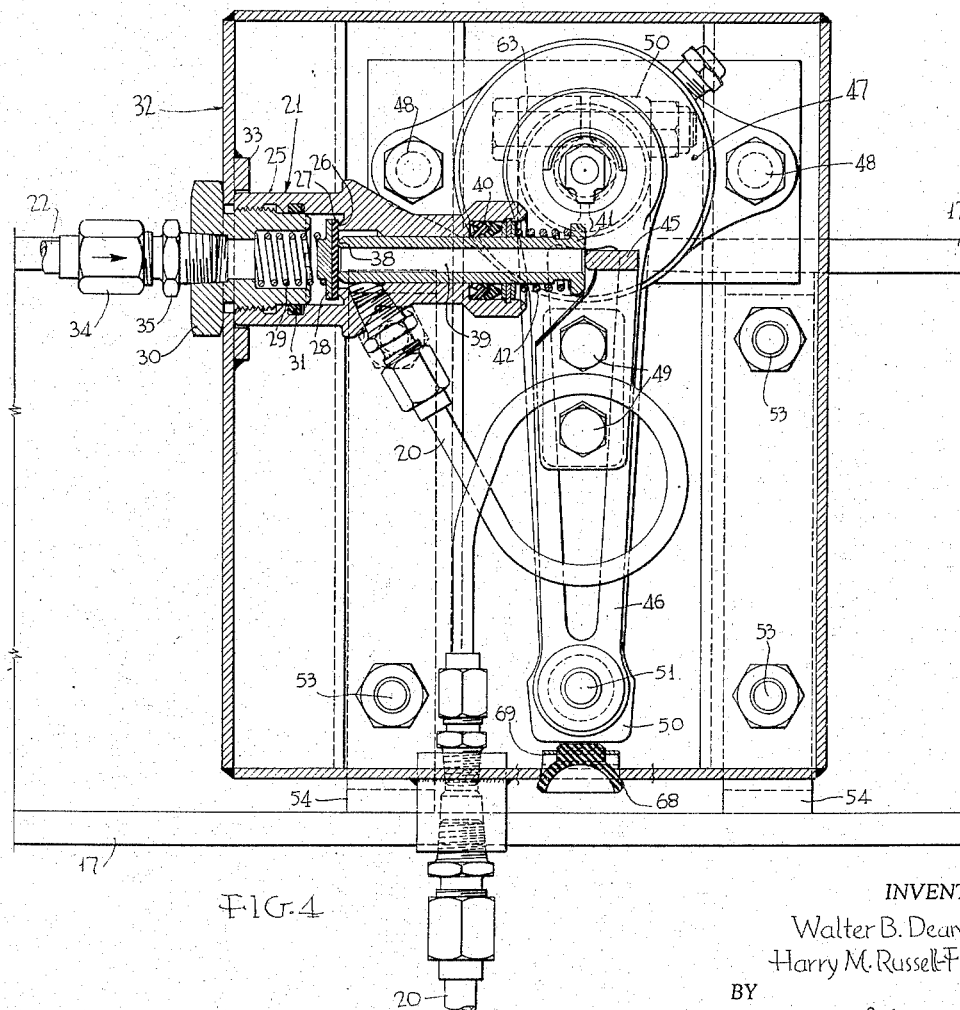

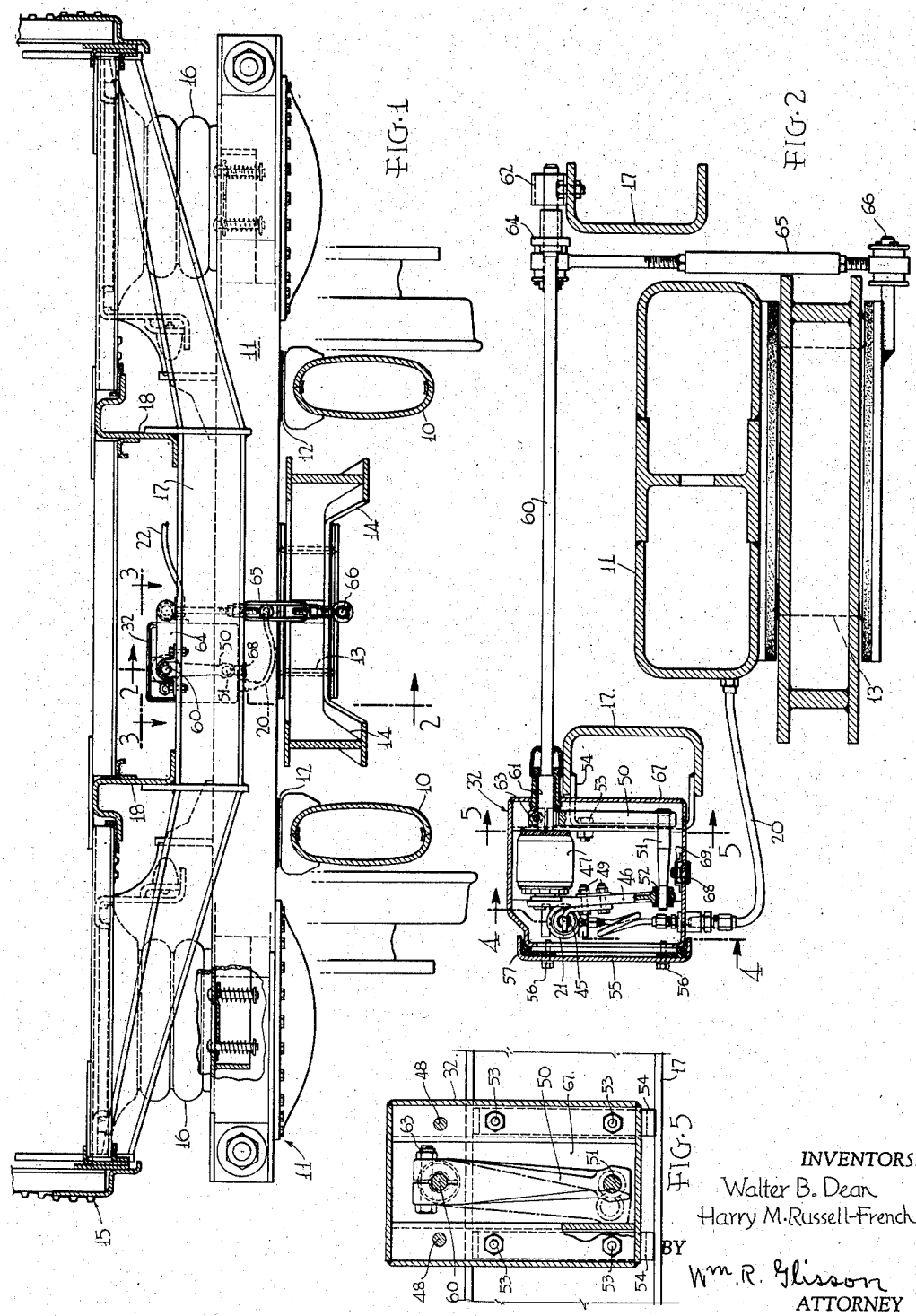

2,883,179

LEVEL CONTROL MEANS FOR AIR SPRING SUPPORTED VEHICLES

Walter B. Dean, Narberth, and Harry M. Russell-French, Philadelphia, Pa., assignors to The Budd Company, Philadelphia, Pa., a corporation of Pennsylvania Application July 12, 1956, Serial No. 597,422

4 Claims. (Cl. 267—3)

This invention relates to level control means for air spring supported vehicles and has for an object the provision of improvements in this art.

One of the particular objects of the invention is to provide improved means for securing proper operation of the level control means in response to actual changes in load on the vehicle but to avoid transient apparent changes due to vehicle vibration caused by non-loading influences such as track irregularities and the like.

Another object is to provide improved resilient and shock absorbing means between the operating and the operated means such as an air valve.

Another object is to provide an improved shock absorbing means for the level control fluid valve.

Another object is to provide means for housing a shock absorbing unit under pressure to exclude dirt, dust and other substances present in air.

Another object is to provide means for limiting the action on a shock absorber and taking excess movement beyond a predetermined amount in resilient motion transmitting means.

The above and other objects and advantages of the invention will be apparent from the following description of an exemplary embodiment shown in the accompanying drawings, wherein:

Fig. 1 is a transverse vertical section through a railway truck on which the levelling means of the present invention is installed;

Fig. 2 is an enlarged vertical section taken on the line 2—2 of Fig. 1;

Fig. 3 is a plan view of parts shown in Figs. 1 and 2, the plane of the view being indicated by the line 3—3 of Fig. 1;

Fig. 4 is a vertical transverse section through a shock absorber and valve assembly, the view being an enlargement taken on the line 4—4 of Fig. 2; and Fig. 5 is an enlarged vertical section taken on the line 5—5 of Fig. 2.

The truck with which the present invention is shown for purposes of illustration is that disclosed in the copending application of Walter B. Dean, Serial No. 562,180, filed January 30, 1956 and conveyed to a common assignee.

The truck comprises side frames 10 which carry a bolster 11 on slide bearings 12, the movement being controlled by a depending center bearing hub 13 on the bolster which is embraced by the socket ends of inward extending projections 14. The bolster at its ends supports a car body 15 through air springs 16. On the sides of the bolster 11 the car body carries depending transverse beams 17 which are trussed over the longitudinal beams 18 of the car.

Between the bolster 11 and transverse beams 17 there is relative vertical movement through the air springs 16 and this movement is used for the operation of the level control means which maintains the car body at a fixed height regardless of the loading thereon. The bolster 11 is hollow and forms an air reservoir for the air springs 16. There are valve controlled passages between the reservoir and air springs resulting in a steadier pressure state in the bolster reservoir than in the air springs so it is the bolster pressure which is controlled to maintain a constant car body level.

An air line connection 20 extends from the bolster reservoir to a level control or levelling valve 21 which is best shown in Fig. 4. A supply pipe 22 extends from the valve 21 to a train line source of air, not shown.

The valve 21 includes a casing 25 having an annular flange 26 against which there seats a resilient face liner 27 carried by a metal disk 28. The disk 28 is urged toward the seating flange 26 by a spring 29 carried in the socket of a pipe bushing 30 which is threaded into the end of the valve casing. A seal 31, such as an O-ring is disposed between the valve casing and bushing. The head of the bushing clamps and seals a wall of a box 32 against the end of the valve casing. The valve casing is accurately positioned by a ring 33 which is secured to the casing wall, as by arc welding. The supply pipe 22 is provided with a union 34 and a nipple 35 which is threaded into the end of the bushing 30.

Within the annular seat 26 and at a distance therefrom there is disposed another annular seat 38 which is formed on the end of a hollow valve stem 39 which slides axially in the valve body and has a packed joint 40 therewith. The stem is provided with an annular flange or head 41 which is urged outwardly by a spring 42. It will now be seen that when the stem 39 is pushed inward from the neutral position in which it is shown it will move the disk 28 and liner 27 away from the outer annular seat 26 and allow high pressure air to flow from the pipe 22 to the line 20 and into the bolster reservoir; and when the stem is moved into the other direction from the middle position it moves its end seat 38 away from the liner 27 and allows air from the bolster reservoir and pipe 20 to escape through the hollow stem 39.

The valve disk with alternately active annular seats has been in use heretofore but its relationship to other elements is believed to be new. The means for operating the valve, now to be described, is also thought to be new.

The end of the hollow valve stem 39 is engaged by an operating element 45 carried by the arm 46 of a shock absorber 47 having its casing secured to a wall of the box 32 as by bolts 48. The shock absorber is of a known movement-damping, drag, or inertia type having a friction or dash-pot action. The operator is preferably adjustable on the arm and is clamped thereon by bolts 49.

The arm 46 is operated by another arm 50 through a crank pin 51, the arm 50 turning about an axis which is in general alignment with the turning axis of the arm 46. To accommodate possible misalignment the end of the pin 51 is slidably mounted in a resilient bushing 52, as of rubber, which is carried by the arm 46.

The box 32 which carries the valve and shock absorber is mounted on one of the transverse beams 17 of the car body, as by being secured by bolts 53 to brackets 54 which are welded to the beam.

The outer end of the box has a large access opening which is closed by a cap 55 secured by cap screws 56, a resilient gasket 57 being interposed as a seal.

The arm 50 is operated by a long torsion rod 60 which is mounted in bearings 61, 62, one of which 62 is carried by a transverse beam 17, and the other 61 being secured in a wall of the box 32. The arm 50 is removably secured to the torsion rod, as by a clamp bolt 63, and the rod is sealed to the box by a resilient sleeve 64.

At its end remote from the arm 50 the torsion rod is provided with an arm 64 which is connected by an adjustable link 65 to an anchor pin 66 which is secured to the bolster 11 of the truck.

As shown in Figs. 4 and 5, the arm 50 has only limited angular movement between the walls of a parallel sided projection 67 of the box 32. This provides fairly rigid operating connections between the arm 50 and the valve stem but with only limited movement on each side of central position so there can be no strain and loss of calibrated setting; whereas all excess movement is taken in the long torsion rod after the arm 50 has reached its stop positions.

As stated, the box 32 is sealed and a pressure above atmospheric is always maintained in the box by the intermittent escape of air from the valve stem 39. Air above a predetermined low pressure is permitted to escape around the periphery of a cup-shaped rubber check valve 68 which is secured by its inner end in a strap 69 secured within the casing. By this arrangement outside air bearing dust and excess moisture is definitely excluded from the box 32.

It is thus seen that the invention provides improved levelling means for a vehicle which is reliable, simple and durable. All transient movement is taken in the resilient torsion rod operator to avoid over-activity of the valve and all over-travel is also taken in the torsion rod to avoid strain and loss of calibration of the valve control means. All major operating parts are housed in a sealed casing at pressure above atmospheric with clean air from the line exhaust and all dirt and grit are excluded.

The location of the levelling valve and its operating mechanism at the center of the width of the car assures an averaged action free from the effects of roll toward either side.

While one embodiment has been illustrated and described by way of example it is to be understood that there may be various changes and embodiments within the limits of the invention.

What is claimed is:

1. Level control means for air spring supported vehicles having a body supported on a wheel frame by air springs, comprising in combination with the body, frame and air springs, a source of air under pressure, a levelling valve in an air line having connections and ports for connecting the air springs to said source or to exhaust, a casing enclosing said valve, a rotary damping shock absorber in said casing, means for operating said valve from said shock absorber, the exhaust from said valve being let into said casing, an escape valve for air from said casing, and resilient means for operating said shock absorber and valve by vertical movements of the vehicle.

2. Level control means for air spring supported vehicles having a body supported on a wheel frame by air springs, comprising in combination with the body, frame and air springs a source of air under pressure, a levelling valve in an air line having connections and ports for connecting the air springs to said source or to exhaust, a casing enclosing said valve, a rotary damping shock absorber in said casing, means for operating said valve from said shock absorber, the exhaust from said valve being let into said casing, an escape valve for air from said casing, and resilient means for operating said shock absorber and valve by vertical movements of the vehicle, said operator including a long torsion rod entering said casing at a sealed opening and having inside the casing an arm drivingly connected with the shock absorber.

3. Level control means for air spring supported vehicles having a body supported on a wheel frame by air springs, comprising in combination with the body, frame and air springs, a source of air under pressure, a levelling valve in an air line having connections and ports for connecting the air springs to said source or to exhaust, a casing enclosing said valve, a rotary damping shock absorber in said casing, means for operating said valve from said shock absorber, the exhaust from said valve being let into said casing, an escape valve for air from said casing, and resilient means for operating said shock absorber and valve by vertical movements of the vehicle, said operator including a long torsion rod entering said casing at a sealed opening and having inside the casing an arm drivingly connected with the shock absorber, and means for limiting the movement of said arm and shock absorber within the casing so that all excess movement of the body is taken in said operator.

4. Level control means for air spring supported vehicles, comprising in combination, a body, a hollow wheel carried bolster forming an air reservoir, air springs supporting said body on said bolster and connected with said bolster reservoir, a source of fluid under pressure on said body, a valve in an air line connected to said source and to said bolster reservoir and connecting the reservoir to exhaust, a sealed casing enclosing said valve and forming a chamber for the exhaust therefrom, a rotary damping shock absorber mounted in said casing and having an arm operatively connected to the movable part of said valve, an operator arm connected to said shock absorber arm by a pin and resilient bushing, means for limiting the movement of said operator arm and shock absorber within said casing, a relief valve for limiting the pressure in said casing, and a long resilient torsion rod connecting said operator arm on the car body with said bolster.

References Cited in the file of this patent

UNITED STATES PATENTS

| | | |
|---|---|---|
| 2,490,311 | Rostu | Dec. 6, 1949 |
| 2,733,931 | Reid et al. | Feb. 7, 1956 |
| 2,757,376 | Brueder | July 31, 1956 |